United States Patent [19]

Kutzavitch

[11] Patent Number: 5,097,501
[45] Date of Patent: Mar. 17, 1992

[54] KEY TELEPHONE INTERFACE

[75] Inventor: Walter G. Kutzavitch, Freehold, N.J.

[73] Assignee: AT&T Bell Laboratories, Murray Hill, N.J.

[21] Appl. No.: 546,323

[22] Filed: Jun. 29, 1990

[51] Int. Cl.$^5$ .............................................. H04M 1/72
[52] U.S. Cl. .................................... 379/165; 379/166; 379/387
[58] Field of Search ............... 379/165, 387, 156, 166, 379/157

[56] References Cited

U.S. PATENT DOCUMENTS

| | | |
|---|---|---|
| 4,088,846 | 5/1978 | McEowen . |
| 4,216,356 | 8/1980 | Burke et al. . |
| 4,220,827 | 9/1980 | Burke et al. . |
| 4,292,474 | 9/1981 | Morrell et al. . |
| 4,363,936 | 12/1982 | Christain et al. .................... 379/165 |
| 4,454,383 | 6/1984 | Judd . |
| 4,459,434 | 7/1984 | Benning et al. . |
| 4,477,697 | 10/1984 | Judd et al. . |
| 4,538,031 | 8/1985 | Benning et al. . |
| 4,572,928 | 2/1986 | Nishimura et al. .................... 379/165 |
| 4,905,274 | 2/1990 | Cooper et al. .................... 379/165 |

Primary Examiner—Stafford D. Schreyer
Attorney, Agent, or Firm—Thomas Stafford

[57] ABSTRACT

Apparatus is disclosed for use in a key set interface to overcome the incompatibility between key sets and tip and ring devices. The interface apparatus rejects ringing voltage and tip and ring loop current intended to be supplied on a first pair of conductors, the TR-pair. The interface further includes apparatus adapted for bi-directional communication of supervisory and control signals. In a preferred embodiment of the invention, a second pair of conductors, the service pair, transports bi-directional supervisory and control signals as well as operating power supplied by a key system controller for non-TR devices. Additionally, a transceiver adapted for sending and receiving voiceband information over the first pair of conductors is incorporated into the interface. An advantage of this key set interface is that operation of a key telephone set does not interfere with the operation of a tip and ring device bridged onto the first conductor pair.

9 Claims, 3 Drawing Sheets

KEY TELEPHONE INTERFACE

CROSS-REFERENCE TO RELATED APPLICATION

U.S. patent application Ser. No. 546,322 was filed concurrently herewith.

TECHNICAL FIELD

This invention relates to telephone type station sets and, more particularly, to interfacing key type station sets and tip and ring type devices to an associated telephone switching unit.

BACKGROUND OF THE INVENTION

Signaling formats and wiring configurations required for enhanced functionality or key type telephone sets (key sets) are incompatible with those required for tip and ring devices (TR devices). Because of this incompatibility, these different set types cannot generally be connected simultaneously to a single station port of a telephone switching unit, e.g., a key telephone control unit. In the context of this application the terms key sets and TR devices are used in accordance with the modern understanding of these terms in the art. Accordingly, key sets are meant to be multifunction telephone station sets or station equipment type adjuncts that utilize special digital messaging protocols to communicate with the control unit concerning actions taken at the set and/or actions that the set should take. TR devices are the well known tip and ring devices including, without limitation: standard, home-use type telephone sets-both rotary and multi-frequency signaling types; answering machines; facsimile (FAX) machines; and modems. As a result of the incompatibility between key sets and TR devices, the customer often must use a more expensive key set where it would be preferential to use an inexpensive TR device, or rely upon special custom adaptors if a less expensive TR device is to be used in conjunction with or instead of a key set.

One commercially available series of telephone systems will accept both key telephone sets and TR devices despite their incompatibility. However, when these otherwise incompatible sets are bridged to a single port in the prior system only the key set is fully functional. On the other hand, the TR device, when connected in such a configuration, cannot be alerted. Consequently, in such a configuration, calls cannot be automatically answered by a conventional answering machine and a facsimile machine bridged with such a key set cannot automatically answer incoming calls. Additionally, in such a configuration, the TR device can not originate calls.

SUMMARY OF THE INVENTION

The problems and limitations with prior key telephone sets are overcome, in accordance with an aspect of the invention, by advantageously including, in a key set interface, apparatus for rejecting ringing voltage and tip and ring loop current intended to be supplied on a first pair of conductors, the TR-pair. The interface further includes apparatus adapted for bi-directional communication of supervisory and control signals.

In a preferred embodiment of the invention, a second pair of conductors, the service pair, transports bi-directional supervisory and control signals as well as operating power supplied by a key system controller for non-TR devices. Additionally, a transceiver adapted for sending and receiving voiceband information over the first pair of conductors is incorporated into the interface. An advantage of this key set interface is that operation of a key telephone set does not interfere with the operation of a tip and ring device bridged onto the first conductor pair. When both a key set and a tip and ring device are simultaneously transmitting voiceband signals, superposition of all the voiceband signals occurs. A result of employing this new interface is that a key system controller employing appropriate circuitry in its station ports can operate, without any loss of functionality, at least one key telephone set including the new interface, at least one tip and ring device or at least a key type set and at least a tip and ring device simultaneously bridged onto the same station port, and further, without the use of any special service circuits or adaptors.

DETAILED DESCRIPTION

Figure 1:
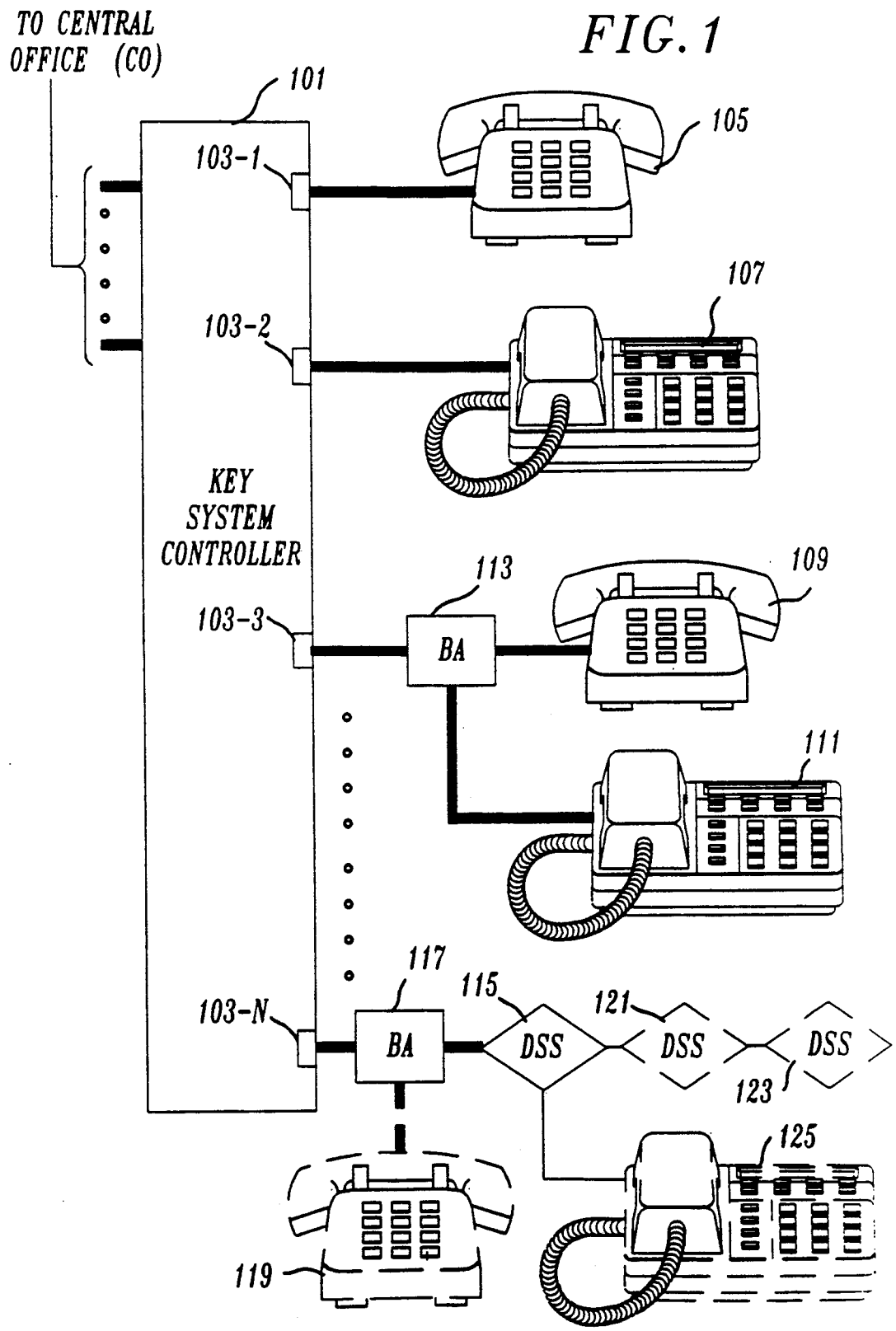
FIG. 1 depicts several arrangements for connecting station sets to a key system controller.

FIG. 1 depicts an exemplary key system controller 101 having ports 103-1 to 103-N. In this example, any of ports 103 is functionally identical to any other of ports 103. Several of ports 103 of key system controller 101 are connected to station equipment. Port 103-1 of key system controller 101 is shown interfaced to TR device 105. Port 103-2 of key system controller 101 is interfaced to key set 107. Displayed is TR device 109 and key set 111 connected, in accordance with an aspect of the invention, in parallel for full functional operation. The parallel connection is established via bridging adapter (BA) 113, which is a conventional telephone Y type jack for creating parallel connections to multiple wires. The parallel combination of both TR device 109 and key set 111 is interfaced to key system controller 101 at port 103-3. Nothing precludes bridging adaptor 113 from being directly incorporated into key system controller 101 or key set 111. Bridging adaptor 113 is shown separately only for clarity purposes. Alternatively, bridging adaptor 113 could be eliminated and a direct parallel connection made between TR device 109 and key set 111. Button box 115, also known as a direct station select (DSS) unit which is an enhanced key type unit, is connected to key system controller 101 at port 103-N via optional bridging adaptor (BA) 117. If optional bridging adaptor 117 is employed, a TR device, e.g., tip and ring telephone 119, can also be bridged, in accordance with an aspect of the invention, in parallel with button box 115. This can be useful for voice communication purposes. Also shown are optional button boxes 121 and 123 which are cascaded with button box 115. Additionally, shown is the attachment of optional key set 125 via button box 115. Within the scope of the present invention many other configurations of equipment combinations and port assignments can be implemented.

Figure 2:
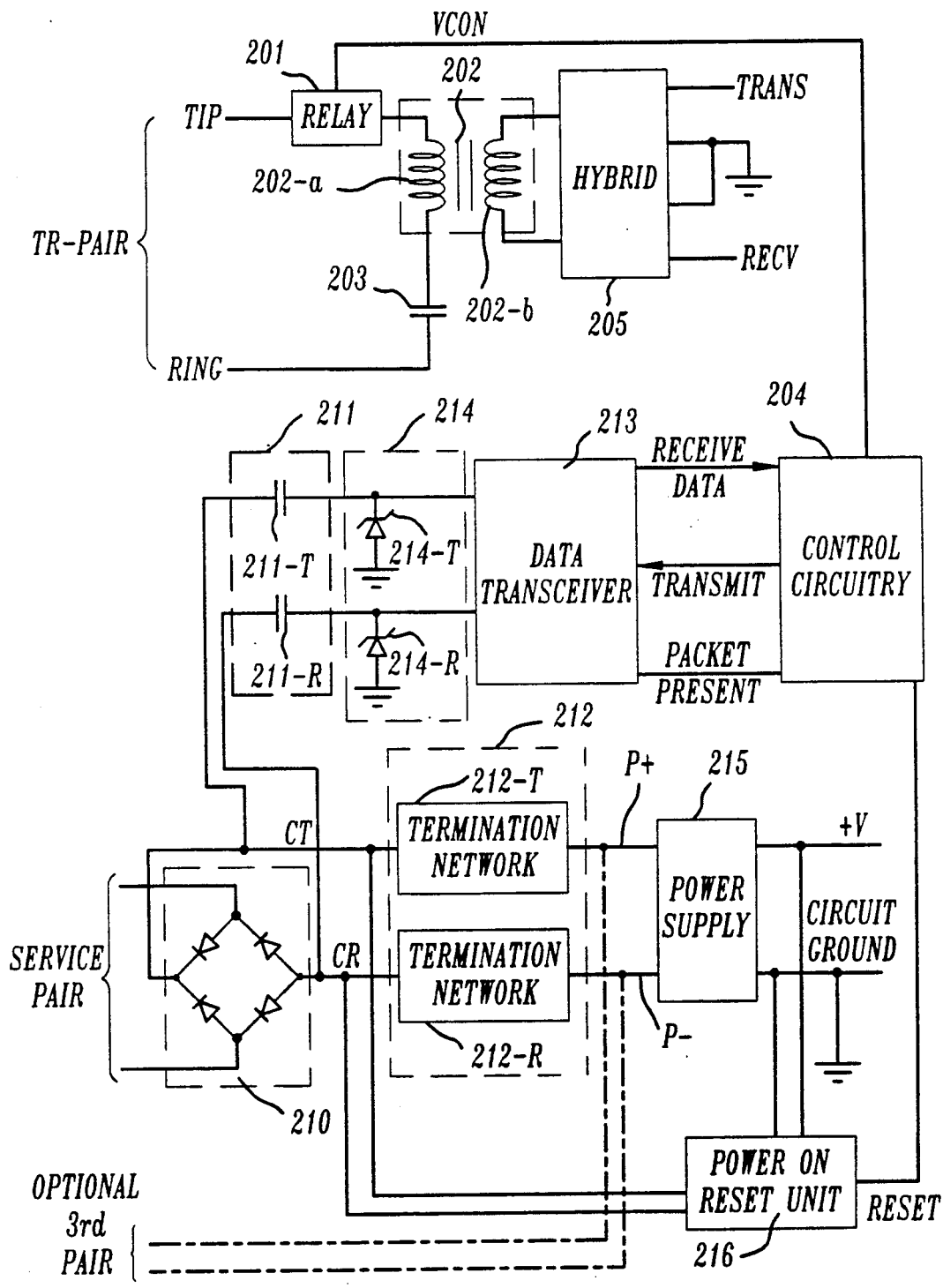
FIG. 2 is an exemplary implementation of interface apparatus required in a key telephone set allowing a tip and ring device, a key set or both simultaneously to operate over a two conductor pair connection with a control unit.

FIG. 2 is an exemplary implementation of apparatus required in a key set to implement the interface, including aspects of the invention. The upper portion of FIG. 2 displays the apparatus required for connecting to a TR-pair comprising conductors TIP and RING. Relay 201, transformer 202 and non-polar capacitor 203 are connected to the TR-pair, typically via a modular telephone jack (not shown.) Conductors TIP and RING carry at least loop current, voiceband communication and an implementation of tip and ring ringing signal (ringing signal) suitable for creating an alerting indication at a TR device. However, not all the abovementioned signals are carried simultaneously. The connection of conductors TIP and RING may be interchanged without affecting circuit operation due to the symmetry of the circuit and the signals passing through it.

The state of relay 201, which may be optical, is controlled by the value of VCON. VCON is generated by control circuit 204. To this end, control circuit 204, by way of example, is responsive to messages received from key system controller 101 (FIG. 1), which is ultimately responsible for the value of VCON and the corresponding state of relay 201, as described below. Initially, VCON is set to a first state which causes the circuit connection though relay 201 to be open. The key set is thus effectively disconnected from the TR-pair. In accordance with an aspect of the invention, when the circuit connection though relay 201 is open, loop current will not be drawn nor will any ringing signal pass though the key set, i.e., loop current and ringing signal are rejected.

In this example, voice access to the TR-pair by the key set is controlled by signaling messages supplied over the service pair from key system controller 101 (FIG. 1). When appropriate signaling messages are received from key system controller 101, e.g., in response to the detection of an off-hook condition at the key set, control circuit 204 causes VCON to change state which, in turn, causes the circuit connection though relay 201 to close. Normal operation requires that the circuit connection though relay 201 be closed only when the ringing signal has ceased. However, in the event a ringing signal is applied while the circuit connection though relay 201 is closed, due to a fault condition, ringing signal will pass through the circuit without affecting its operation. Thus, ringing signal is rejected by the key set interface, in accordance with an aspect of the invention, since the ringing signal is not altered in either state of relay 201. When relay 201 is closed, a circuit path between TIP and RING is formed comprising relay 201, inductor 202-a, which is one half of transformer 202, and capacitor 203. Inductor 202-a and capacitor 203 rapidly begin to charge with inductor 202-a eventually becoming a direct current (DC) short circuit and capacitor 203 becoming a DC open circuit. In accordance with an aspect of the invention, when fully charged, capacitor 203 acting as an open circuit blocks the transmission of DC current thereby rejecting loop current from the TR-pair during normal operation.

Although DC loop current is blocked when relay 201 is closed, voiceband signals pass freely through both inductor 202-a and capacitor 203. These signals are magnetically coupled into inductor 202-b, the secon half of transformer 202, in well known fashion. Additionally, voiceband signals applied to inductor 202-b are magnetically coupled into inductor 202-a and differentially transmitted through relay 201 and capacitor 203 out onto the TR-pair.

Echoes on the communications line should be minimized to obtain good quality voice communications. Therefore, the AC impedance presented by inductor 202-a, as seen by key system controller 101 (FIG. 1), should equal the impedance presented by an associated one of ports 103 (FIG. 1). Similarly, the AC impedance presented by an associated one of ports 103 should match the AC impedance presented by TR devices to be attached to the port. It follows that the AC impedance of inductor 202-a, as seen by key system controller 101, should equal the impedance of typical TR devices. In the United States this impedance is 600 ohms.

Voiceband signals to be transmitted from the key set are supplied as an input to one port of hybrid 205 on the TRANS line. Voiceband signals received from the key set are supplied as an output to another port of hybrid 205 on the RECV line. The combined transmit and receive signals appear at the third port of hybrid 205 which, in this example, is connected across inductor 202-b. Hybrids, also known as 4-wire to 2-wire converters, are well known in the art.

The lower section of FIG. 2 shows exemplary apparatus for connecting a key set to the service pair of conductors. The service pair is comprised of two conductors CONTROL TIP (CT) and CONTROL RING (CR). Again, the service pair carries at least bi-directional supervisory and control signals. In this example, the service pair also carries operating power intended for non-TR devices such as key sets. In this example, CT is positive with respect to CR. The actual potential difference between CT and CR is at the implementor's discretion. For ease of implementation in a preferred embodiment, CT is at ground potential and CR is at approximately −48 volts DC. Consequently, a single −48 V DC power supply could supply power both for key sets via the service pair and for TR devices via the TR-pair. Bi-directional differential data packets for transporting the supervisory and control information are superimposed on the power carried on CT and CR. The data packets, in this example, are transmitted in a ping-pong fashion. Further, each data packet comprises 24 bits, wherein the first 16 bits are the actual information containing a supervisory and control message and the last 8 bits are a checksum computed in a predetermined fashion based upon the first 16 bits of information. Each 16 bit message can yield only one checksum. A data packet is valid when the 8 bit checksum it contains corresponds to the 16 bits of information therein. Each 16 bit pattern is predefined as a command, a status indication or other necessary information required to be transported between key system controller 101 and a key set for supporting implementation of enhanced functionality features. In an example, packet 000000000000010100010100 indicates that a key set should sound a predetermined alerting tone. The formation of such message sets is well known in the art. The data signals that are superimposed in this example conform to those disclosed in U.S. Pat. No. 4,454,383. Of course, utilization of any other signaling method that can be superimposed is not precluded.

Optional polarity guard 210, comprising a diode bridge is attached directly to the service pair. Polarity guard 210 insures that the signals from conductor CT actually are connected to that part of the interface expecting a more positive potential. Further, polarity guard 210 insures that the signals from conductor CR actually are connected to that part of the interface requiring a more negative potential. Signals and power extracted from the more positive conductor by polarity guard 210 are output at node CT. Signals and power extracted from the more negative conductor by polarity guard 210 are output at node CR. Such arrangements are well known in the art.

Node CT is connected to capacitor 211-T and termination network 212-T. Similarly, node CR is connected to capacitor 211-R and termination network 212-R. Capacitors 211 block DC power from entering data transceiver 213 but permit supervisory and control messages, which are AC signals, to reach data transceiver 213. Further, capacitors 211 receive supervisory and control messages from data transceiver 213 and superimpose them onto the power present at conductors CT and CR for transmission back through polarity guard 210 toward the service pair. Additionally, optional protection unit 214 protects data transceiver 213 from large voltage transients that may become present on CT and CR. In this example, protection unit 214 comprises zener diodes 214-T and 214-R configured to clamp any signal to their rated value.

When a packet supplied from the service pair via capacitors 211 is detected by data transceiver 213, an indication is signalled on the PACKET PRESENT lead. In this example implementation, negative type logic is used for the implementor's convenience. Thus, the detection of the presence of a packet is indicated by a logical 0 on the PACKET PRESENT lead. Absence of a packet is indicated by a logical 1 on the PACKET PRESENT lead. Message data decoded from a packet is supplied as an output on the RECEIVE data lead to key set control circuit 204. Data for transmission from control circuit 204 to key system controller 101 (FIG. 1) is supplied as an input to data transceiver 213 on the TRANSMIT lead. The data is then differentially encoded, transformed to appropriate signal levels and supplied as an output via capacitors 211 for superimposition onto conductors CT and CR. Alternatively, the differential data may be directly supplied over a pair of leads to data transceiver 213 or other necessary processing steps may be performed by control circuit 204. As indicated above, any other signaling method may be used without departing from the spirit and scope of the invention. If the service pair of conductors only carries supervisory and control signals, polarity guard 210 and capacitors 211 are not needed. Data transceiver 213 would be connected directly to the service pair.

Termination networks 212 block the transmission of AC signals, i.e., the data signals containing the control and supervisory information, yet permit the passage of DC signals, i.e., the operating power. In a preferred embodiment, termination networks 212 are transistor based constant current drivers, which are well known. DC operating power passes on leads P+ and P− to power supply 215 which provides regulated power at the voltage levels required for operation of the circuitry in the key set. Alternatively, any termination matching the requirements of the chosen transceiver circuit can be used. If a third conductor pair or an alternative source supplies operating power for the key set, optional polarity guard 210 and termination networks 212 are not required. Instead, the operating power supply should connect directly or via a polarity guard to power supply 215 at leads P+ and P−. Power on reset unit 216 generates a RESET indication that is supplied to control circuit 204 for restarting and reinitializing the key set. A RESET indication is supplied when the voltage supplied for powering a key set reaches a first predetermined value after having been less than a second predetermined value which is less than said first predetermined value. If operating power is supplied on an optional third conductor pair, power on reset unit 216 would be connected across said third pair rather than across CT and CR.

Figure 3:
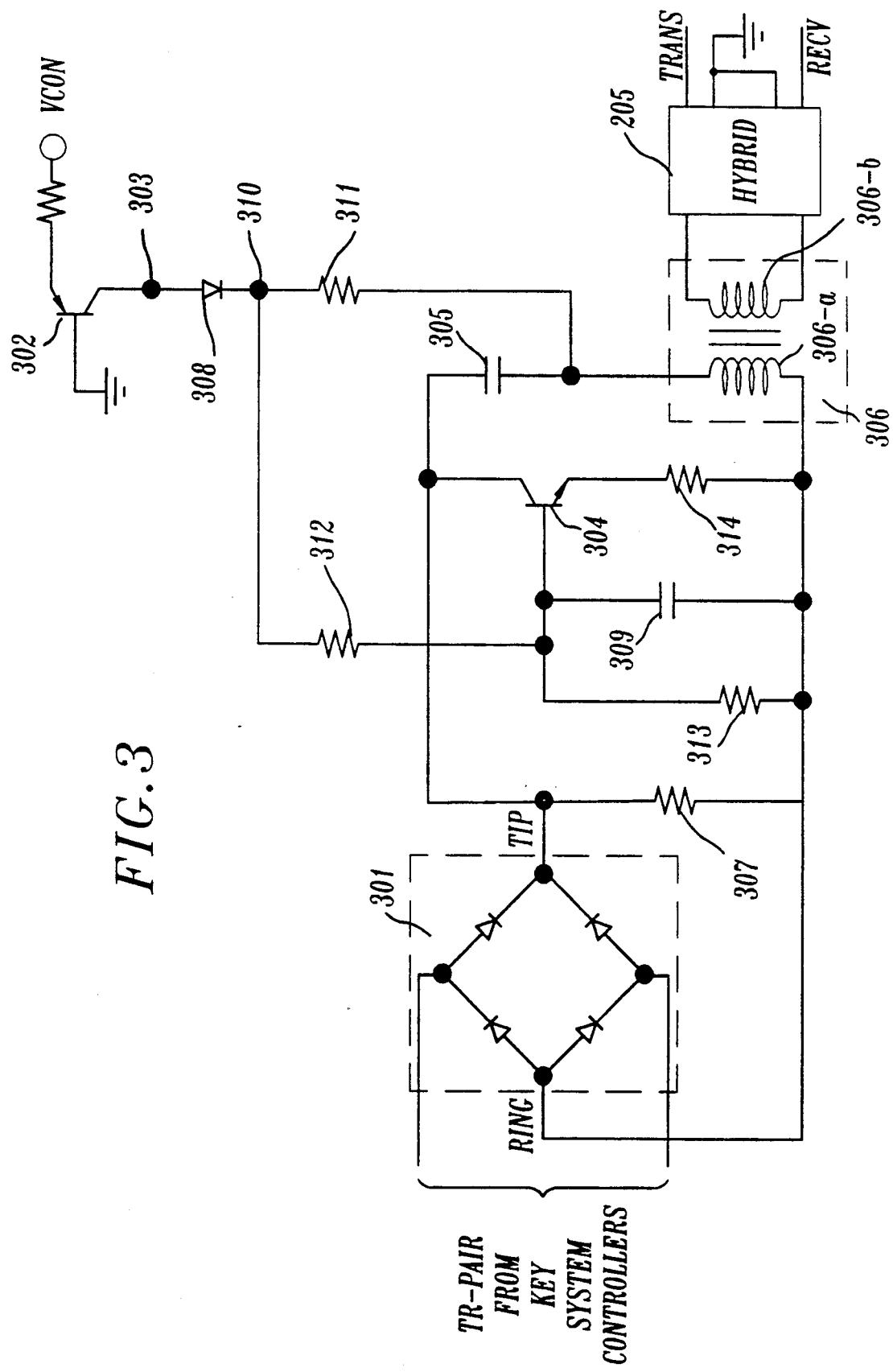
FIG. 3 shows an alternative arrangement for connecting to the TR-pair.

An alternative arrangement for connecting to the TR-pair is shown in FIG. 3. This arrangement achieves lower cost by eliminating the expensive relay element. However, activation of the circuit for voice communication requires that a small but fixed loop current be drawn from the TR-pair. In accordance with an aspect of the invention, the amount of current drawn is maintained at a value smaller than that which the chosen loop current detector in key system controller 101 (FIG. 1) can detect and loop current beyond this predetermined value is considered rejected. An exemplary current value is 7 mA. Therefore, a key set activated for voice transmission over an interfaced TR-pair will not generate an off-hook signal to key system controller 101 at the termination of the TR-pair on one of ports 103 (FIG. 1). An advantage derived from rejecting loop current so as not to generate an off-hook signal is that pulse (rotary) dialing from a TR device can be detected at any of ports 103 even if the TR device is bridged onto said port in parallel with a key set.

Accordingly, conductors of the TR-pair from key system controller 101 are connected to polarity guard 301 typically through a modular telephone jack (not shown). The main purposes and uses of polarity guard 301 are well known. When a DC path is created between the conductors of the TR-pair, loop current is supplied as an output from node TIP by polarity guard 301. Similarly, when the DC path is created between conductors of the TR-pair, loop current is supplied as an input to polarity guard 301 from RING.

VCON from control circuit 204 (FIG. 2) controls the completion of the DC path between node TIP and node RING. When VCON is a logical 0 transistor 302 is OFF, no current flows from node 303 and transistor 304 is correspondingly OFF. Capacitor 305 inhibits DC current from flowing through inductor 306-a (one half of transformer 306) resulting in polarity guard 301 being OFF, i.e., in a nonconducting state. In accordance with an aspect of the invention, if a ringing signal is received from key system controller 101 (FIG. 1) an initial conducting path will temporarily be set up through polarity guard 301, from TIP to capacitor 305 and inductor 306-a back through RING and polarity guard 301. During the first ring cycle, capacitor 305 will quickly charge to the peak value of the ringing signal. Once charged, capacitor 305 will block any further transmission of ringing signal. Additionally, when the ringing signal is removed, the polarity of the charge on capacitor 305 reverses and thereby back biases the diodes of polarity guard 301. Capacitor 305 will therefore be unable to discharge, except through resistor 307. The value of resistor 307 is chosen to provide a very large discharge time constant relative to the interval of the ringing signal. This in effect rejects the ringing signal, in accordance with an aspect of the invention. Diode 308 protects transistor 302 from damage by the ringing signal that could be transmitted through capacitor 309.

When VCON is a logical 1 a current flows through transistor 302, diode 308 and resistor 312 activating a constant current source comprising transistor 304, resistors 313 and 314 and capacitor 309. In turn, this causes a current to be drawn from node TIP to node RING.

The level of the constant current drawn should be sufficient to allow the diodes that comprise polarity guard 301 to turn ON to transmit voiceband signals bi-directionally without distortion. Alternative mechanisms for providing the constant current, such as opto-isolators can be used without violating the scope or spirit of the invention. No AC signal flows through transistor 304. A DC current also flows from node 310 through resistor 311 and inductor 306-a to RING.

The activation of the constant current source creates an AC signal path from node 310 to RING via resistor 312 and capacitor 309. An equal impedance AC signal path from node 310 to TIP comprising resistor 311 and capacitor 305 insures that any noise from node 310 is coupled equally to TIP and RING. The noise is thus transmitted to the TR-pair through polarity guard 301 as inaudible common mode noise, rather than audible differential noise.

When transistor 304 is ON, an AC conducting path exists through polarity guard 301, from TIP to capacitor 305 and inductor 306-a (one half of transformer 306) back through RING and polarity guard 301. Voiceband communication is inductively transferred from inductor 306-a to inductor 306-b and vice-versa in the same manner as for inductors 202-a, 202-b and hybrid 205 as described for FIG. 2.

I claim:

1. Apparatus in a key telephone station set or enhanced functionality station unit adapted to be connected via an at least first conductor pair for communicating with a telephone switching system control unit comprising:

means for rejecting tip and ring ringing signal supplied from said first conductor pair;

means for rejecting loop current, greater than a predetermined value, supplied from said first conductor pair; and means adapted for transmitting and receiving supervisory and control signals.

2. The invention as described in claim 1 wherein said means adapted for transmitting and receiving transmits and receives said supervisory and control signals over an at least second conductor pair.

3. The invention as described in claim 1 wherein said apparatus further includes means adapted for transmitting and receiving voiceband communication over said first conductor pair.

4. The apparatus as defined in claim 3 further including means responsive to a control signal for inhibiting access to said first conductor pair by said means for transmitting and receiving voiceband communication.

5. The apparatus as defined in claim 4 wherein said means for inhibiting includes means responsive to special signaling messages from said means adapted for transmitting and receiving said supervisory and control signals.

6. The apparatus as defined in claim 2 further including means adapted for obtaining operating power intended to be supplied from an at least third conductor pair.

7. The apparatus as defined in claim 2 wherein said signaling on said second conductor pair is differential.

8. The apparatus as defined in claim 2 further including means adapted for obtaining operating power supplied from said at least second conductor pair.

9. The apparatus as defined in claim 8 further including polarity guard means adapted for providing insensitivity to the polarity of said signals and said power intended to be supplied from said at least second conductor pair.

* * * * *